US011815010B2

(12) United States Patent
Dixon et al.

(10) Patent No.: US 11,815,010 B2
(45) Date of Patent: Nov. 14, 2023

(54) METHOD OF CONTROLLING A TURBOCHARGER

(71) Applicant: Ford Global Technologies, LLC, Dearborn, MI (US)

(72) Inventors: Jon Dixon, Essex (GB); Shawn Turek, Ypsilanti, MI (US); Nicholas Parisi, Plymouth, MI (US); Paul Michael Batten, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/869,431

(22) Filed: Jul. 20, 2022

(65) Prior Publication Data
US 2022/0356837 A1 Nov. 10, 2022

Related U.S. Application Data

(63) Continuation of application No. 17/109,951, filed on Dec. 2, 2020, now Pat. No. 11,421,582.

(51) Int. Cl.
*F02B 37/12* (2006.01)
*F02D 23/00* (2006.01)
*F02D 41/14* (2006.01)

(52) U.S. Cl.
CPC ............. *F02B 37/12* (2013.01); *F02D 23/00* (2013.01); *F02D 41/1448* (2013.01); *F02B 2037/125* (2013.01); *F02D 2200/021* (2013.01); *F02D 2200/024* (2013.01); *F02D 2200/101* (2013.01)

(58) Field of Classification Search
CPC .... F02B 37/12; F02B 2037/125; F02D 23/00; F02D 41/1448; F02D 41/0007; F02D 2200/021; F02D 2200/024; F02D 2200/101
USPC ............. 60/602, 605.1; 701/103–104; 123/2, 123/406.24, 564; 415/1, 27
See application file for complete search history.

(56) References Cited

U.S. PATENT DOCUMENTS

| | | | |
|---|---|---|---|
| 4,936,741 A * | 6/1990 | Blotenberg | F04D 27/0207 415/27 |
| 5,798,941 A | 8/1998 | McLeister | |
| 6,691,685 B2 | 2/2004 | Jones et al. | |
| 6,779,344 B2 | 8/2004 | Hartman et al. | |
| 7,422,414 B2 | 9/2008 | Fujii et al. | |
| 7,607,416 B2 | 10/2009 | Sato | |
| 7,805,938 B2 | 10/2010 | Roh | |
| 8,813,494 B2 | 8/2014 | Hofer et al. | |
| 9,038,578 B2 * | 5/2015 | Payri | G01M 15/02 73/114.01 |
| 9,279,374 B2 * | 3/2016 | Buckland | F02B 37/164 |
| 9,470,141 B2 * | 10/2016 | Kemmer | F02D 41/0007 |
| 9,771,858 B2 * | 9/2017 | Masuma | F02D 41/023 |
| 9,909,490 B2 * | 3/2018 | Hand, III | F02D 41/1402 |
| 10,215,115 B1 * | 2/2019 | Ranga | F02D 41/0002 |
| 10,508,591 B2 * | 12/2019 | Upadhyay | F02B 37/18 |

(Continued)

*Primary Examiner* — Shafiq Mian
(74) *Attorney, Agent, or Firm* — HALEY GUILIANO LLP (57) ABSTRACT

Systems and methods are described for operating a turbocharger. A current exhaust manifold pressure is determined based on an engine operating condition. A current operating condition of the turbocharger is determined. A surge correction factor is determined based on the current operating condition of the turbocharger. The current exhaust manifold pressure is adjusted based on the surge correction factor.

19 Claims, 4 Drawing Sheets

(56) References Cited

U.S. PATENT DOCUMENTS

| | | | |
|---|---|---|---|
| 2009/0198432 A1* | 8/2009 | Tabata | F02D 23/02 |
| | | | 701/103 |
| 2015/0047344 A1 | 2/2015 | Shao et al. | |
| 2016/0265468 A1* | 9/2016 | Takayanagi | F02D 41/1401 |
| 2016/0305353 A1* | 10/2016 | Sase | F02D 41/30 |
| 2018/0363541 A1* | 12/2018 | Sase | F04D 27/0261 |
| 2020/0011232 A1* | 1/2020 | Heinken | F02B 37/24 |

\* cited by examiner

METHOD OF CONTROLLING A TURBOCHARGER

CROSS-REFERENCE TO RELATED APPLICATIONS

This application is a continuation of U.S. patent application Ser. No. 17/109,951, filed Dec. 2, 2020, the disclosure of which is hereby incorporated by reference herein in its entirety.

BACKGROUND

The present disclosure relates to the operation of a turbocharger. More particularly, but not exclusively, the present disclosure relates to operating a turbocharger within operational limits when setting an exhaust manifold pressure as the control objective.

SUMMARY

A turbocharger, or turbo, is an air pump that forces more air into the engine. With more air, the engine can generate power more efficiently, improving performance, reducing fuel consumption and cutting down on emissions. As exhaust gas exits the engine, it drives a turbine of the turbo, which turn a compressor of the turbo, pulling in air and compressing it. In this way, the turbine is driven by the waste energy using the exhaust gas. Turbo engines may be operated by controlling the vanes of a turbocharger in order to achieve a desired level of engine intake manifold pressure, otherwise known as the boost pressure. In some examples, variable-geometry turbochargers (VGTs), otherwise known as variable-nozzle turbines (VNTs), are used to achieve a desired (e.g., target) boost pressure for a given operating condition. However, in some operating conditions, e.g., high altitudes and hotter climates, the maximum target boost pressure deliverable by the turbo may be restricted to avoid the turbo operating above allowable limits, such as a compressor outlet temperature limit, an exhaust manifold pressure limit, a maximum turbo speed limit and/or a surge limit. Therefore, in some situations, it is desirable to implement an alternative method of controlling the turbo, e.g., by using the exhaust manifold pressure as the target control objective rather than boost pressure. However, in doing so, there is a risk that the turbo may operate above its allowable operational limits.

In view of the foregoing, the present disclosure provides methods and systems for ensuring that the operational limits of a turbocharger are respected whilst using the exhaust manifold pressure as a target control objective.

In accordance with a first aspect of the disclosure, there is provided a method for operating a turbocharger. The method comprises determining a current exhaust manifold pressure, e.g., based on an engine operating condition. The method may further comprise determining a current operating condition of the turbocharger, e.g., to determine a surge limit of the turbo at the current operating conditions and/or whether the surge limit is being exceeded. The method may further comprise determining a surge correction factor based on the current operating condition of the turbocharger. The method may further comprise adjusting the current exhaust manifold pressure, e.g., as a primary objective, based on the surge correction factor, e.g., by applying the surge correction factor to (e.g., dynamically and/or continuously) stay within or at surge limits. The method may comprise outputting a value for the adjusted exhaust manifold pressure to control a physical adjustment of one or more elements of the turbocharger.

In some examples, an objective of the present disclosure to adjust the exhaust manifold pressure (as a primary objective) to achieve the turbocharger operating condition based on a current state and deviation from the surge limit, e.g., in order to transition from actual or current exhaust manifold pressure to an adjusted or desired exhaust manifold pressure based on the deviation. In some variations, operating limits of the turbocharger may comprise one or more of: a turbo charger compressor outlet temperature; an exhaust manifold pressure; a maximum turbo speed; and a turbocharger surge limit. It shall be appreciated that other operating limits that constrain the performance of the turbocharger can be also be or alternatively be taken into account.

In some variations, the engine operating condition comprises at least one of: an aftertreatment condition; an aftertreatment condition at idle; an engine speed; an engine loading condition; an engine temperature; an air flow rate, e.g., through the engine; an environmental operating condition, e.g., conditions at high altitudes; and/or a combustion mode of the engine. In some cases, the limit which may be of most concern in the case of increasing engine load at idle may be the surge limit, since the other limits tend to only be encountered at high load conditions, whilst the surge line is a constraint mostly at low air mass flow rates.

In some variations, the current operating condition of the turbocharger comprises a current boost pressure. In some variations, the method may further comprise a step of determining a maximum operating boost pressure, e.g., a surge limited boost pressure, of the turbocharger corresponding to a surge limit, e.g., based on compressor mass flow and/or compressor inlet pressure.

In some variations, the method may further comprise a step of determining a surge ratio, the surge ratio being a ratio of the maximum operating boost pressure to the current boost pressure. For a given compressor, there is a defined pressure ratio as a function of air mass flow which must not be exceeded in order to avoid surge or, in other words, to avoid exceeding surge limits. The preset disclosure seeks to avoid exceeding surge limits by applying a turbo control loop that uses exhaust manifold pressure as the primary control objective.

In some variations, the method may further comprise a step of integrating the surge ratio to determine the surge correction factor.

In some variations, the method may further comprise a step of limiting the surge correction factor to an upper limit and/or a lower limit, e.g., in some variations, the upper limit is 1 and the lower limit is calibratable.

In some variations, the surge correction factor may be reduced towards the lower limit when the current boost pressure is determined to be exceeding the surge limit, increased when the current boost pressure is determined to be below the surge limit, and/or fixed when the current boost pressure is determined to be at the surge limit. It may be ideal for a vehicle to operate at the surge limit, and not below or above the surge limit.

In some variations, the step of outputting the adjusted exhaust manifold pressure comprises a physical adjustment of one or more elements of the turbocharger, e.g., a valve and/or a vane.

In some variations, the method may further comprise a step of alternating the primary objective between adjusting the current exhaust manifold pressure and the current boost pressure, e.g., to effectively achieve one or more desired operating conditions.

In some variations, adjusting the current exhaust manifold pressure comprises determining a weighting to be applied to the exhaust manifold pressure. In some variations, the weighting is limited to a calibratable lower limit and 1, e.g., such that the set point of the engine's exhaust manifold pressure may be reduced within an allowed range within, or at, the surge limit, but never increased to exceed the surge limit.

According to a second aspect, there is provided a system for operating a turbocharger. The system comprises means for determining a current exhaust manifold pressure, e.g., based on an engine operating condition. The system may further comprise means for determining a current operating condition of the turbocharger, e.g., to determine a surge limit of the turbo at the current operating conditions and/or whether the surge limit is being exceeded. The system may further comprise means for determining a surge correction factor based on the current operating condition of the turbocharger. The system may further comprise means for adjusting the current exhaust manifold pressure, e.g., as a primary objective, based on the surge correction factor, e.g., by applying the surge correction factor to (e.g., dynamically and/or continuously) stay within or at surge limits. The system may comprise means for outputting a value for the adjusted exhaust manifold pressure to control a physical adjustment of one or more elements of the turbocharger.

According to a third aspect, there is provided a non-transitory computer-readable medium having non-transitory computer-readable instructions encoded thereon for searching for controlling a turbocharger that, when executed by control circuitry, cause the control circuitry to: Perform a step of determining a current exhaust manifold pressure based on an engine operating condition. The non-transitory computer-readable medium may further be operable to perform a step of determining a current operating condition of the turbocharger, e.g., to determine whether a surge limit is being exceeded. The non-transitory computer-readable medium may further be operable to perform a step of determining a surge correction factor based on the current operating condition of the turbocharger. The non-transitory computer-readable medium may further be operable to perform a step of adjusting the current exhaust manifold pressure as a primary objective based on the surge correction factor, e.g., by applying the surge factor to dynamically and continuously stay within or at surge limits, and a step of outputting the adjusted exhaust manifold pressure.

According to a fourth aspect, there is provided a turbocharger comprising the above system for operating a turbocharger.

According to a fifth aspect, there is provided an engine comprising the above system for operating a turbocharger.

According to a sixth aspect, there is provided a vehicle comprising the above system for operating a turbocharger.

According to other aspects, there are provided methods and systems for operating a turbocharger. An exhaust pressure setpoint (P_ExhBase) is determined, e.g., based on one or more engine and/or operating conditions. The exhaust pressure setpoint may be a current exhaust pressure, e.g., a current exhaust manifold pressure. A maximum operating boost pressure (P_BoostSurgeLim) of the turbocharger is determined, e.g., based on compressor mass flow and compressor inlet pressure. A current boost pressure (P_BoostAct) of the turbocharger is determined. The ratio of the maximum operating boost pressure to the current boost pressure (SurgeRatio) is determined. A surge correction factor (FactorSurgeCor) is determined by integrating the ratio of maximum operating boost pressure to the current boost pressure. The surge factor correction factor is limited, e.g., clipped (clip) 234, to an upper limit, e.g., to a value equal to 1, and a lower limit (CalibratedMinimum) 236, which may be calibratable, depending on one or more engine and/or vehicle parameters. The exhaust pressure setpoint is adjusted based on the limited surge factor correction factor.

It should be appreciated that other features, aspects and variations of the present disclosure will be apparent from the disclosure herein of the drawings and detailed description. Additionally, it will be further appreciated that additional or alternative embodiments of methods of and systems for operating a turbocharger may be implemented within the principles set out by the present disclosure.

FIGURES

The above and other objects and advantages of the disclosure will be apparent upon consideration of the following detailed description, taken in conjunction with the accompanying drawings, in which.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
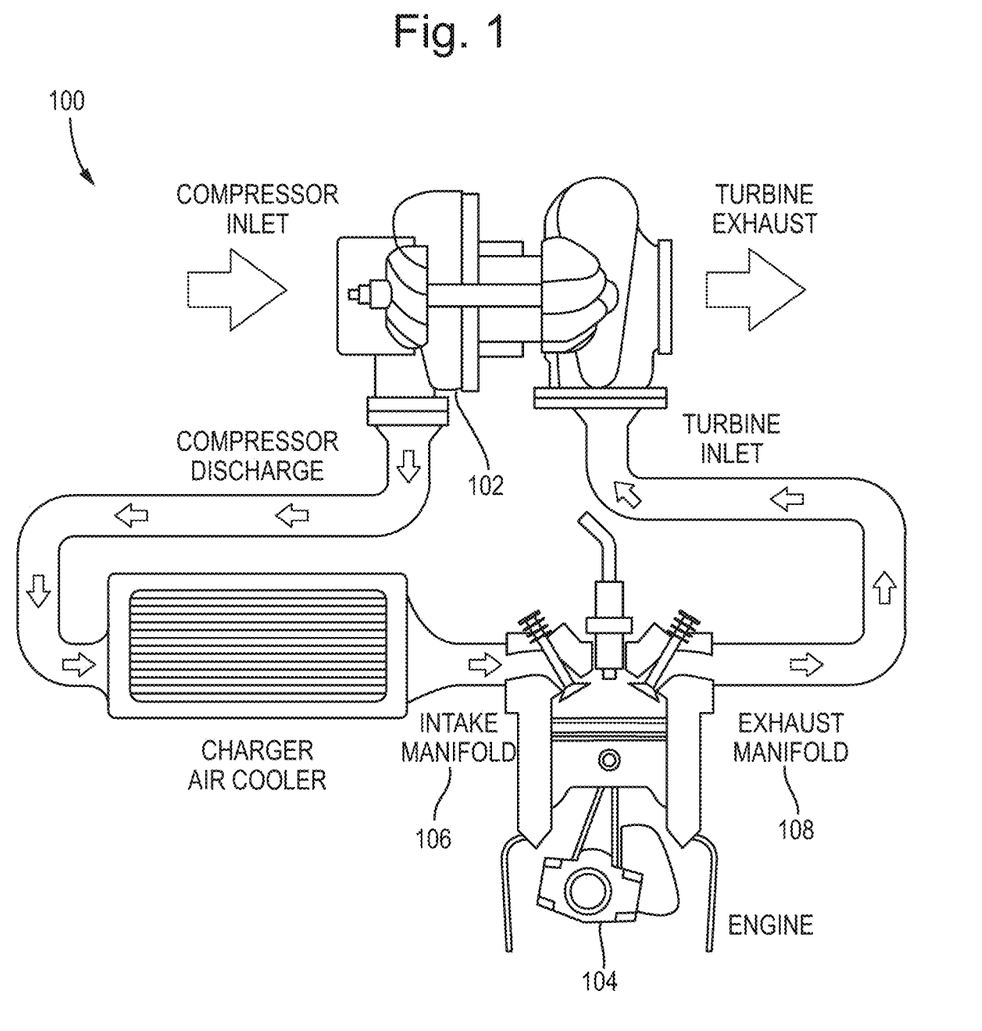
FIG. 1 illustrates an example schematic diagram of an engine and turbocharger system in accordance with some examples of the present disclosure.

With reference to FIG. 1, an example structure of a turbocharger and engine system 100 of the present disclosure will now be described. FIG. 1 illustrates an example schematic flow diagram in accordance with some examples of the present disclosure.

When operating turbochargers, such as turbocharger 102, there is a desired or ideal boost pressure for optimized performance of an engine system 100. It may be understood that an optimal, or substantially optimal, engine performance corresponds to low emissions and power efficiency. At some operating conditions, e.g., at high altitudes or ambient temperatures, operating at the ideal boost pressure level may result in exceeding limits of the turbocharger 102. In such cases, the primary objective conventionally would be to remain within the turbocharger's limits by reducing the target boost pressure. For example, turbocharger limits typically include, but are not limited to, compressor outlet temperature, exhaust manifold pressure, maximum turbo speed and surge limit. However, the below description refers to a specific example of using a surge limit as a control objective. However, it shall be appreciated that other limits that constrain the performance of the system 100 can be also be, or alternatively be, taken into account.

It is understood that surge occurs when the aerodynamic ability of the compressor, to increase pressure at a given mass flow, for example, is exceeded. This can result in excessive noise and possible compressor damage. For a given compressor, there is a defined pressure ratio as a function of air mass flow which must not be exceeded in order to avoid surge or, in other words, to avoid exceeding surge limits of the engine system 100.

In certain modes, e.g., to increase the temperature of the aftertreatment at idle, the primary or priority objective, otherwise described herein as the control objective, is to increase load on the engine 104 using the turbocharger 102. At the mode, it can be preferable to use the pressure at the exhaust manifold 108 as the control objective for turbocharger 102 control rather than the (boost) pressure at the intake manifold 106 which is typically used. Thus, in example embodiments, the resulting boost pressure (P_Boost) can be set to be of secondary importance when it comes to system adjustment.

However, if only the pressure at the exhaust manifold 108 is used as a set point, or target point, without any limitations applied, there exists a risk that the limits relating to the boost pressure may be exceeded. In the case of increasing engine load at idle, as aforementioned, the limit which may be of most concern can be the surge limit, or the surge line. It shall be appreciated that other limits tend to only be encountered at high load conditions whilst the surge line is a constraint encountered mostly at low air mass flow rates.

Thus, in some examples, the turbocharger 102 control loop, which normally uses boost pressure as its objective, instead (or, in some case, in addition) uses exhaust manifold pressure as the primary control objective. Additionally, it is the objective of this disclosure to implement the exhaust manifold pressure as the primary control objective whilst remaining within the surge limits of the boost pressure. Also, in example embodiments, the measured exhaust manifold pressure can be provided as feedback for the control loop. As such, the engine's boost pressure is not part of the turbocharger's control loop, although, in some embodiments, the primary objective may be capable of alternating between the engine's exhaust manifold pressure and the engine's boost pressure.

Conventional solutions and methods have ignored the surge limit and instead maintained a requirement as to the careful calibration and validation for a range of parts and conditions in order to ensure robustness of the engine. However, the solution provided by the disclosure herein uses analysis of data to ensure operation at, but not beyond, the surge limit in a robust and effective way.

Figure 2:
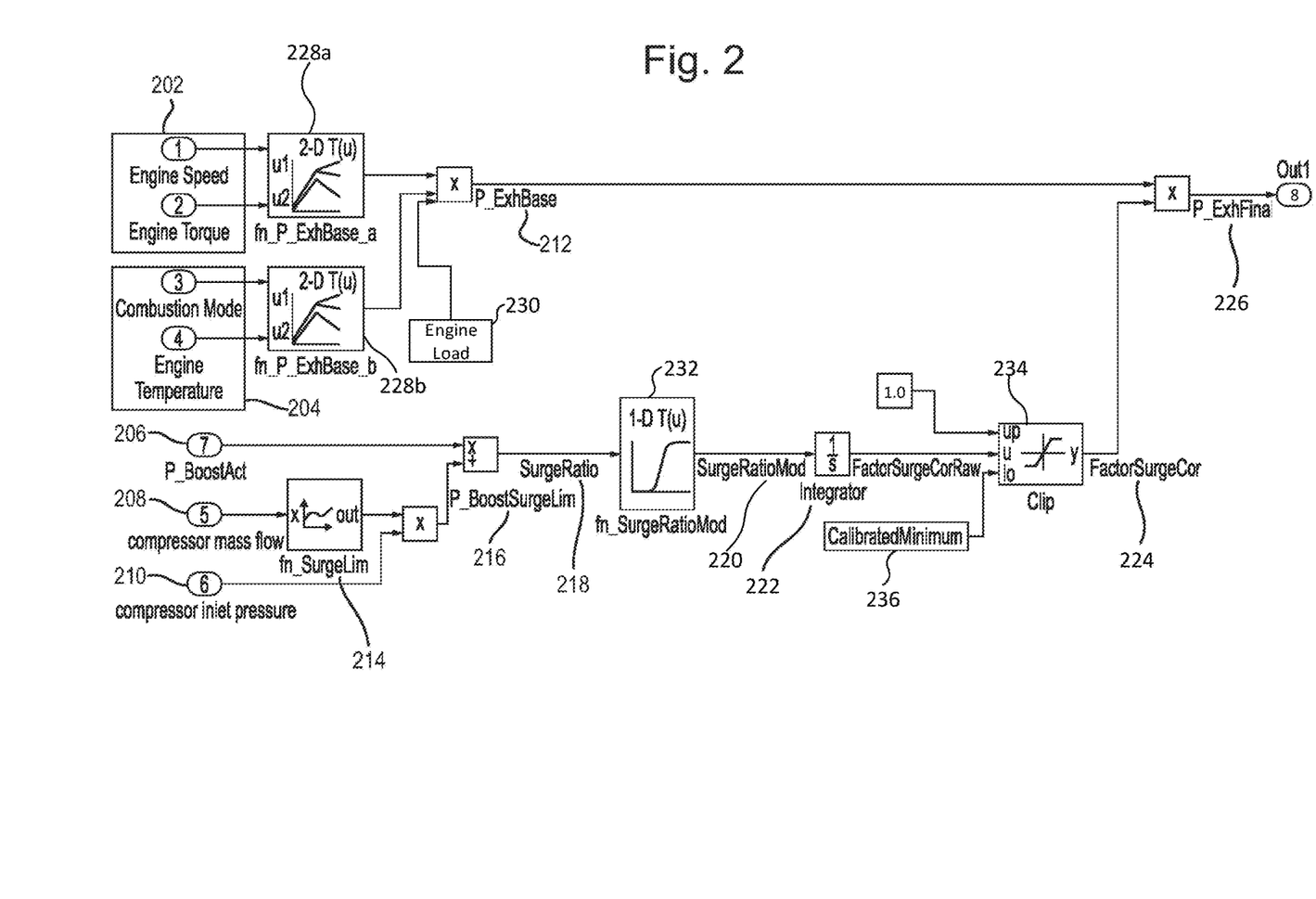
FIG. 2 illustrates a schematic flowchart depicting controlling surge limitation in accordance with some examples of the present disclosure.

With reference to FIG. 2, an example flowchart of controlling the operation of the turbocharger to stay within surge limits will now be described. More specifically, FIG. 2 illustrates a schematic flowchart depicting controlling surge limitation in accordance with some examples of the present disclosure.

The disclosure describes a method suitable for ensuring that the engine surge limit (fn_SurgeLim) 214 is respected whilst operating the turbo with a target exhaust manifold pressure. More particularly, it is the objective of the present disclosure to stray away from directly controlling the engine's boost pressure when operating turbochargers to stay within such operating limits.

In some embodiments, when the engine is required to operate in a mode prioritising the engine's exhaust manifold pressure as the set point, the set point (P_ExhBase) 212, e.g., a computed base exhaust manifold temperature, can be first formed from a number of look-up tables (fn_P_ExhBase_a and/or fn_P_ExhBase_b) 228a/228b. The set point of the exhaust manifold pressure can be determined, e.g., by taking into account variables such as engine speed and/or engine torque 202, engine load 230, engine temperature and/or combustion mode 204.

Additionally, in some examples, by considering the compressor mass flow 208 and the compressor inlet pressure 210, the surge limited boost pressure (P_BoostSurgeLim) 216, e.g., defined as a pressure ratio dependent on mass flow rate or the maximum operating boost pressure, can be calculated from a look-up table also. In such embodiments, the surge limited boost pressure represents the value of boost pressure that must not be exceeded by the engine.

In some examples, the ratio of the current measured boost pressure (P_BoostAct) 206 to the surge limited boost pressure (P_BoostSurgeLim) 216 can be calculated as a ratio (SurgeRatio) 218. It may be understood that a surge ratio 218 value of greater than one indicates that the surge limit is being exceeded, a value of one indicates operation at the surge limit and a value less than one indicates that the engine is operating below the surge limit.

In some examples, the surge ratio 218 can be provided as an input to an integrator 222 whose output is a factor, described herein as the surge correction factor (FactorSurgeCor) 224, by which the set point of the engine's exhaust manifold pressure (P_ExhBase) 212 is multiplied. In some embodiments, the surge ratio 218 value can be modified (SurgeRatioMod) 220 through a look-up table (fn_SurgeRatioMod) 232 to allow tuning based on feedback or response. In some embodiments, the output factor (FactorSurgeCor) 224 may be limited to between a calibratable lower limit and one, such that the set point of the engine's exhaust manifold pressure may be reduced within an allowed range within or at the surge limit, but never increased to exceed the surge limit.

The use of an integrator 222 can stabilize and dampen the control. In order to tune the response of the integrator 222, the surge ratio 218 may be used as the input to a look-up table, whose output is then the input to the integrator 222. In this way, the resulting output factor (FactorSurgeCor) 224 reduces when boost pressure exceeds the surge limit is exceeded and the output factor 224 increases whilst the boost pressure is below the surge limit. It shall be understood that the output factor 224 would be set to be stable or fixed when at the surge limit in order to maintain maximum boost pressure.

The effect of the present disclosure is that, when the actual boost pressure is below the surge limit or threshold, the surge factor (FactorSurgeCor) 224 will tend towards 1, having no direct effect on the set point of the exhaust manifold pressure. However, if the surge limit is exceeded, the target point (P_ExhFinal) 226, i.e., the final set point for exhaust pressure that can be modified according to the surge protection factor, will be reduced. In this way, the system indirectly affects the boost pressure until the boost pressure is determined to be below or at the surge limit. Thus, the turbo can be operated using the exhaust manifold pressure as the main objective control whilst complying with boost pressure constraints, e.g., surge limit.

In some examples, feedback data can be obtained by monitoring the exhaust manifold pressure which can be used to adjust, correct or determine subsequent surge factors 224 output by the integrator 222 to dynamically and continuously stay within or at surge limits. Often have feedback sensors sub-engine system operable to transmit or communicate feedback data to the control unit. The control unit then receives the feedback data and may determine whether to adjust any of the available variables in order to achieve the desired operations of the turbocharger.

It shall be appreciated that there are many forms of feedback sensors or feedback control systems as well as many variations of turbocharger loop control circuitry readily available in the field of electromechanics for use in combination with turbochargers of described embodiments.

Figure 3:
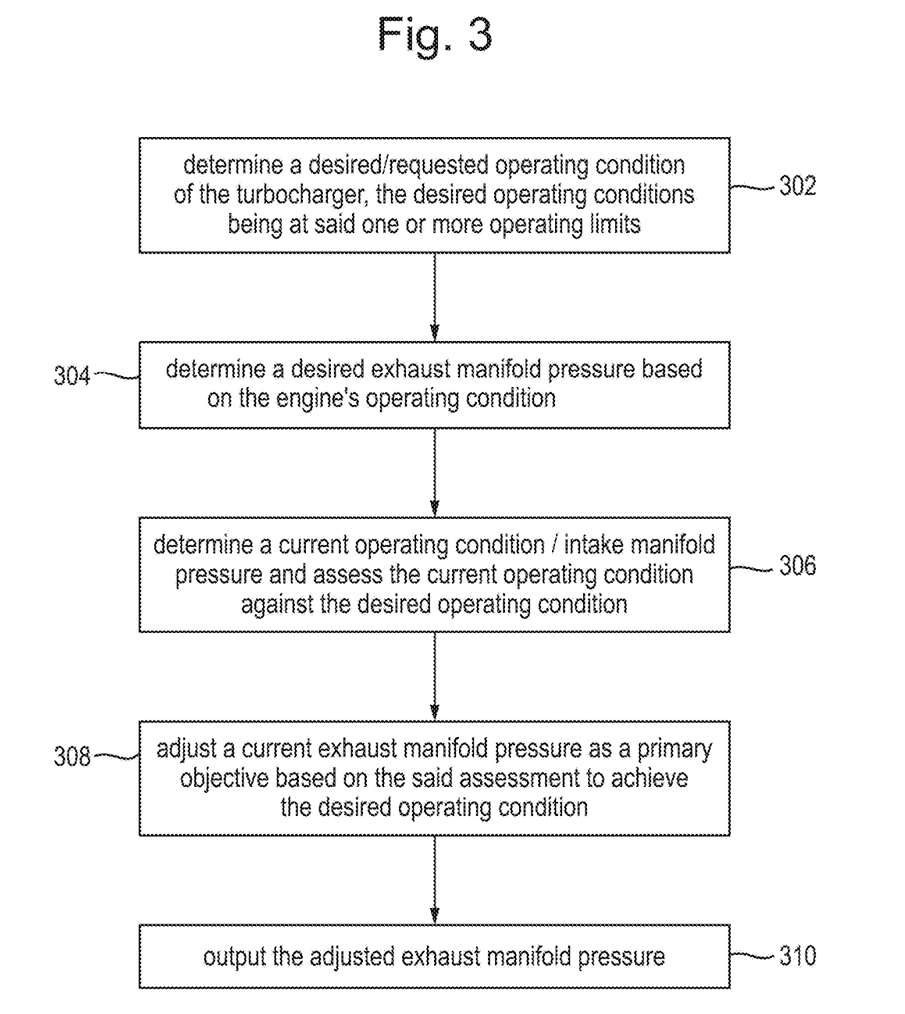
FIG. 3 illustrates an example flowchart of a method of the present disclosure in accordance with some examples of the present disclosure.

With reference to FIG. 3, an example flowchart the present disclosure will now be described. More specifically, FIG. 3 illustrates a particular embodiment of operating turbochargers by controlling the exhaust manifold pressure as the control objective in accordance with example embodiments of the present disclosure.

At step 302, the method determines a desired or requested operating condition of the turbocharger, the desired operating conditions being at the one or more operating limits e.g., a surge limit.

At step 304, the method determines a current exhaust manifold pressure, e.g., a final or target exhaust pressure, based on an engine's operating condition. For example, the engine's operating condition may be any one of: an aftertreatment condition, an aftertreatment condition at idle, engine speed, engine loading condition, engine temperature; air flow rate; conditions at high altitudes; and/or combustion mode. For example, the limit which may be of most concern can be the surge limit in the case of increasing engine load at idle.

At step 306, the method determines a current operating condition of the turbocharger, such as the boost pressure, and assessing the current operating condition against the desired operating condition, e.g., to determine whether the surge limit is being exceeded.

At step 308, the method adjusts a current exhaust manifold pressure, using the exhaust manifold pressure as the primary control objective, based on the assessment to achieve the desired operating condition, e.g., by applying a surge correction factor based on the current operating condition of the turbocharger to dynamically and continuously stay within or at surge limits.

At step 310, the method outputs the adjusted exhaust manifold pressure. Thus, the present disclosure ensures that engine operation limits are constantly respected whilst operating a turbocharger with a target exhaust manifold pressure.

It shall be appreciated that the pseudo codes referred to in accordance with example embodiments may be defined by the following functions:

P_ExhBase=f(engine speed, engine torque, combustion mode, engine temperature)
P_BoostSurgeLim=f(compressor mass flow)*(compressor inlet pressure)
SurgeRatio=(P_BoostAct)/(P_BoostSurgeLim)
SurgeRatioMod=f(SurgeRatio)
FactorSurgeCorRaw=Integral(SurgeRatioMod)
FactorSurgeCor=Lim it(FactorSurgeCorRaw) (min=calibrateable, e.g., 0.8, maximum=1)
P_ExhFinal=(P_ExhBase)*(FactorSurgeCor)

It shall be appreciated that tests or measurements can be performed to determine whether the above embodiments are applied to a turbocharger. For example, it can be determined if the turbo is running in turbine inlet or inlet manifold pressure control mode by the stability and value of each in response to load changes. If in turbo inlet pressure control mode, controlled, smooth and accurate observance of the surge limit when close to it would indicate surge limit control was active.

Figure 4:
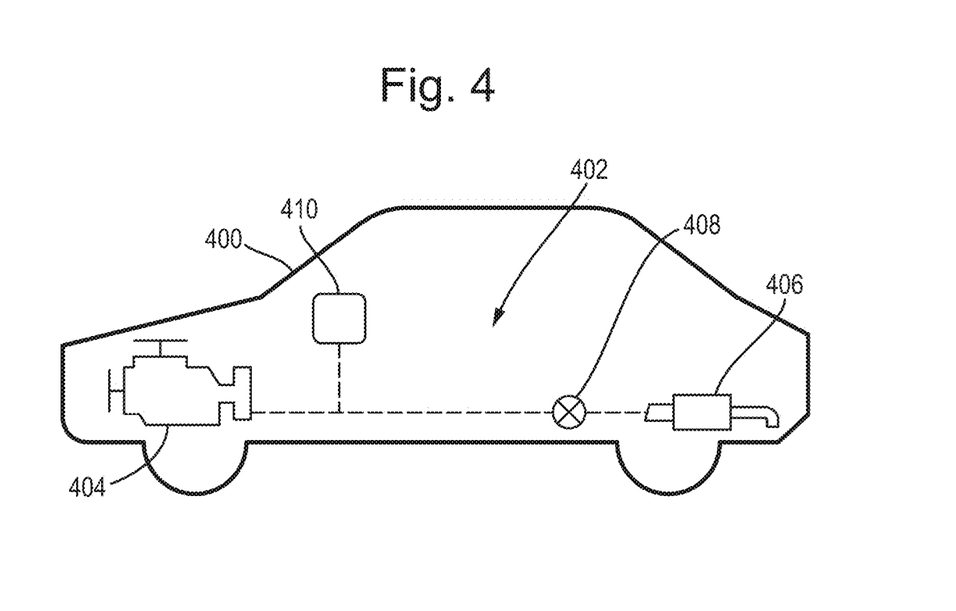
FIG. 4 is a schematic showing a vehicle comprising an exemplary turbocharger control system, in accordance with some examples of the disclosure.

FIG. 4 shows a vehicle 400 comprising a turbocharger control system 402, in accordance with some examples of the disclosure. In the example shown in FIG. 4, the vehicle 400 comprises an engine 404, an exhaust system 406 and actuator 408 configured to control the flow of exhaust gases through the exhaust system 406, e.g., by moving a moveable element of an exhaust gas flow valve. Control unit 410 is in operable communication with engine 404, e.g., by virtue of an engine control module, exhaust system 406, e.g., by virtue of an exhaust control module, and actuator 408, e.g., by virtue of an actuator control module. Control unit 410 is configured to carry out one or more of the above disclosed methods to operate a turbocharger, as described above.

Figure 5:
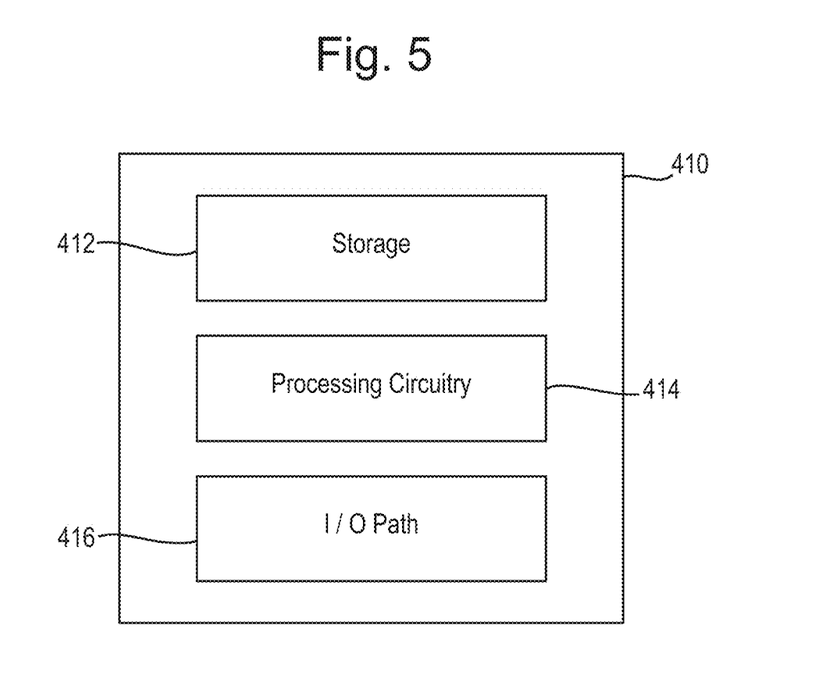
FIG. 5 is a block diagram showing exemplary control circuitry, in accordance with some examples of the disclosure.

FIG. 5 shows an exemplary block diagram of control unit 410. Control unit 410 includes storage 412, processing circuitry 414 and I/O path 416. Control unit 410 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Storage 412, and/or storages of other components of actuator control system 402 may be an electronic storage device. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, control unit 410 executes instructions for an application stored in memory (e.g., storage 412). Specifically, control unit 410 may be instructed by an application to perform the methods/functions discussed herein.

The control unit 410 may be configured to transmit and/or receive data via I/O path 416. For instance, I/O path 416 may include a communication port(s) configured to transmit and/or receive data from at least one of an engine control module, an actuator control module and a vehicular system control module, such as an exhaust system control module.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, shall be appreciated that the disclosure is not limited hereto. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A method for operating a turbocharger the method comprising:
    determining, via a control unit comprising processing circuitry, an exhaust pressure setpoint based on an engine operating condition of an engine;
    determining, via the processing circuitry, a current and maximum operating boost pressure of the turbocharger;
    determining, via the processing circuitry, a surge correction factor based on the ratio of the maximum operating boost pressure and the current boost pressure;
    limiting, via the processing circuitry, the surge correction factor; and
    adjusting, via an actuator of the exhaust system, the exhaust pressure setpoint based on the limited surge correction factor.

2. The method of claim 1, wherein limiting the surge correction factor is based on the engine operating condition.

3. The method of claim 2, further comprising clipping, via the processing circuitry, the limited surge correction factor to an upper limit and a lower limit.

4. The method of claim 3, wherein the upper limit is equal to 1, and the lower limit is calibratable.

5. The method of claim 3, further comprising:
    limiting the surge correction factor at the lower limit when the current boost pressure is determined, by the processing circuitry, to be exceeding the surge limit.

6. The method of claim 1, wherein the engine operating condition comprises at least one of: an aftertreatment condition; an aftertreatment condition at idle; an engine speed; an engine loading condition; an engine temperature; an air flow rate; and a combustion mode.

7. The method of claim 1, wherein the surge correction factor is determined by integrating, by the processing circuitry, the ratio of the maximum operating boost pressure to the current boost pressure.

8. The method of claim 1, further comprising outputting, by the processing circuitry, the adjusted exhaust pressure setpoint to control the turbocharger.

9. The method of claim 1, wherein the exhaust pressure setpoint is a current exhaust pressure.

10. The method of claim 1, wherein the maximum operating boost pressure is determined based on a compressor mass flow and a compressor inlet pressure.

11. A system for operating a turbocharger, the system comprising:
    an engine;
    an exhaust system comprising an actuator configured to control the flow of exhaust gases through the exhaust system; and
    a control unit communicatively coupled to the engine, the exhaust system, and the actuator, wherein the control unit comprising processing circuitry is configured to:
        determine an exhaust pressure setpoint based on an engine operating condition of an engine;
        determine a current and maximum operating boost pressure of the turbocharger;
        determine a surge correction factor based on the ratio of the maximum operating boost pressure and the current boost pressure;
        limit the surge correction factor; and
        adjust the exhaust pressure setpoint based on the limited surge correction factor.

12. The system of claim 11, wherein limiting the surge correction factor is based on the engine operating condition.

13. The system of claim 12, wherein the processing circuitry is configured to clip the limited surge correction factor to an upper limit and a lower limit.

14. The system of claim 13, wherein the upper limit is equal to 1, and the lower limit is calibratable.

15. The system of claim 14, wherein the processing circuitry is further configured to:
    limit the surge correction factor at the lower limit when the current boost pressure is determined to be exceeding the surge limit.

16. The system of claim 11, wherein the engine operating condition comprises at least one of: an aftertreatment condition; an aftertreatment condition at idle; an engine speed; an engine loading condition; an engine temperature; an air flow rate; and a combustion mode.

17. The system of claim 11, wherein the exhaust pressure setpoint is a current exhaust pressure.

18. The system of claim 11, wherein the maximum operating boost pressure is determined based on a compressor mass flow and a compressor inlet pressure.

19. A vehicle comprising a system for operating a turbocharger, the system further comprising:
    an engine;
    an exhaust system comprising an actuator configured to control the flow of exhaust gases through the exhaust system; and
    a control unit communicatively coupled to the engine, the exhaust system, and the actuator, wherein the control unit comprising processing circuitry is configured to:
        determine an exhaust pressure setpoint based on an engine operating condition of an engine;
        determine a current and maximum operating boost pressure of the turbocharger;
        determine a surge correction factor based on the ratio of the maximum operating boost pressure and the current boost pressure;
        limit the surge correction factor;
        adjust the exhaust pressure setpoint based on the limited surge correction factor.

* * * * *